Patented Sept. 10, 1946

2,407,486

UNITED STATES PATENT OFFICE 2,407,486

VETERINARY COMPOSITIONS

Albert L. Flenner and Clarence A. Littler, Wilmington, Del., assignors to E. I. du Pont de Nemours & Company, Wilmington, Del., a corporation of Delaware No Drawing. Application November 21, 1941, Serial No. 419,994

1 Claim. (Cl. 167—53)

This invention relates to compositions of matter and is particularly directed to a finely divided dry product which is free-flowing and readily miscible with water to yield a fluid suspension having any desired degree of stability or viscosity, which products or compositions consist essentially of phenothiazine with small amounts of gum karaya, water-soluble alginates, and, if desired, a wetting agent.

This application is in part a continuation of our co-pending application Serial No. 388,122, filed April 11, 1941.

Phenothiazine is commonly used in veterinary medicine to control various internal parasites and is most commonly administered orally as an aqueous dispersion. In order that the phenothiazine may be administered in this manner it is necessary that it be conditioned to impart the desired degree of fluidity and stability to such suspension. For these purposes phenothiazine has heretofore been prepared and marketed as wet paste in which the phenothiazine is mixed with bentonite as a wetting and dispersing agent, or molasses, together with the requisite quantity of water. It is also known that phenothiazine can be conditioned suitable to provide a water-dispersible composition for application as horticultural spray, U. S. Patent 2,161,462, but such a product is not suitable for oral administration.

These various compositions which have been heretofore available on the market are not the most desirable for handling phenothiazine. Pastes are difficult to transport, requiring special containers and special care in handling; they are difficult to dilute to proper concentration, since the wet material tends to stick on the sides and bottom of the diluting bath and disperses only slowly. When pastes are diluted and dispersed their stability is very low—the coarser particles rapidly settle so that the user may soon be administering a concentration lower than that initially prepared unless the suspension is frequently stirred. Products made up with bentonite have similar disadvantages and, moreover, have been observed to show lower toxicity than untreated phenothiazine.

The objects of this invention are to avoid the difficulties of the prior art, to provide a material which may be easily and satisfactorily handled for transportation, to provide a material which may be easily and readily dispersed to the desired concentration, to provide a material which in the desired aqueous dispersion has suitable stability, to provide a material which is essentially as effective as phenothiazine, and to provide a material which may be easily and safely handled and administered by non-technical people.

These objects are accomplished by this invention which embodies a proper combination of wetting, dispersing and viscosity increasing agents and their incorporation with phenothiazine to provide a dry, free-flowing and dispersible product which when applied in the 40% suspension commonly recommended for oral administration will have the desired stability and fluidity. We have found that such a proper combination is obtained by mixing proper amounts of gum karaya, sodium alginate or other water-soluble alginate, and if desired a wetting agent, all in the dry state, with dry phenothiazine powder to provide a product having essentially the following composition:

|  | Per cent |
|---|---|
| Sodium alginate | 0.05–5 |
| Gum karaya | 0.05–2 |
| Wetting agent | 0.0–0.5 |
| Phenothiazine | Balance |

This provides a product which is a dry powder and hence easy to handle, which by slight variations in composition may be used to prepare suspensions containing as little as 25% solids with the maintenance of any desired degree of viscosity or stable pastes containing 40% or more solids; which by the combination of gum karaya and sodium alginate gives a unique behavior such that high fluidity can be maintained without concentration variations due to sedimentation, which by slight variations in the ratio of the unusually adaptable combination of gum karaya and sodium alginate gives wide variations of fluidity so that any need or demand can readily be met and in which the effectiveness of the phenothiazine is unadulterated. In obtaining these ends the combinations of gum karaya and sodium alginate are critical and the same results are not obtained by the substitution of other protective colloids such as gelatin, or other gums such as acacia or tragacanth.

The following examples illustrate suitable preparations in which the percentages are figured on a weight basis:

Example 1

|  | Per cent |
|---|---|
| Phenothiazine | 97.5 |
| Gum karaya | 1.0 |
| Sodium alginate | 1.5 |

When prepared as a 40% suspension this product provides a very stable paste of creamy consistency.

Example 2

|  | Per cent |
|---|---|
| Phenothiazine | 97.5 |
| Gum karaya | 1.0 |
| Sodium alginate | 0.3 |

The sodium alginate in this example is the product of another manufacturer.

When prepared as a 40% suspension this product provides a paste in all respects comparable with that provided by Example 1.

Example 3

|  | Per cent |
|---|---|
| Phenothiazine powder | 99.8 |
| Gum karaya | 0.1 |
| Sodium alginate (as used in Example 2) | 0.1 |

This composition when made into a 40 per cent product is not as stable as material in Example 2, but due to its high fluidity is useful in cases where the dry powder is made into a suspension and used as a drench immediately.

It will be noted from these examples that the amount of sodium alginate required may vary considerably according to the source of the product, and it is intended that such variations shall be within the scope of the invention.

The combination of gum karaya and sodium alginate or other water-soluble alginate is unusual, for though other gums and protective colloids fall in the same general classification none can be successfully substituted therefor. As far as known no other protective colloid, save one, will disperse phenothiazine adequately in cold water, and that one will not disperse phenothiazine sufficiently to form a stable paste of creamy consistency as described in the foregoing examples. Thus the alginates are unique in the combination of our invention. Likewise, no other gum, so far as known, will give the viscosity control at less than 10 times the concentration required with karaya gum. Thus karaya gum is also unique in the combination. For some purposes as little as 0.1% of gum karaya will give the desired viscosity. For practically all purposes 2% of the material will suffice. For most purposes around 1% will be most suitable. Other gums do not give the same desirable control and undesirably adulterate the product.

The alginates are a generally well known class of materials extracted from marine algae. See, for example, U. S. Patent 1,778,688 and French Patent 696,778. Those alginates, such as the sodium, potassium, ammonium and iron salts, which possess colloidal dispersing properties are within the scope of our invention. These we speak of as water-soluble in contradistinction to such alginates as the alkaline earth alginates which are not capable of swelling in water.

We do not limit our invention to any particular wetting agent since those skilled in the art can readily determine which of the myriad wetting agents available are suitable. We prefer, however, to use sodium "Lorol" sulfate in which the term "Lorol" refers to a mixture of radicals derived from the higher alcohols obtained by the hydrogenation of cocoanut oil, because we know that sodium "Lorol" sulfate is non-toxic when administered orally. In view of the character of the product the wetting agent obviously should be non-toxic when administered orally. Other than this any wetting agent may be employed.

We claim:

A composition of matter consisting in a dry free-flowing dispersible powder comprising 0.05–5% sodium alginate, 0.05–2% gum karaya, and the balance substantially all phenothiazine, being characterized in a 40% aqueous suspension as a stable fluid paste.

ALBERT L. FLENNER.
CLARENCE A. LITTLER.